United States Patent

[11] 3,622,540

[72] Inventors Sei Hashimoto;
    Keizo Nakatani; Shoji Suzuki, all of Kyoto,
    Japan
[21] Appl. No. 832,858
[22] Filed June 12, 1969
[45] Patented Nov. 23, 1971
[73] Assignee San-Abbott Limited
    Kyoto, Japan

[54] METHOD OF CURING EPOXY RESINS USING N-(AMINOALKYL)-LACTAMS OR DIAZA-BICYCLO-ALKENES
    8 Claims, No Drawings
[52] U.S. Cl. .................................................... 260/47,
    260/2, 260/88.3, 260/830
[51] Int. Cl. ................................................... C08g 30/14
[50] Field of Search ........................................ 260/2 EP, 2
    CM, 47 EC, 47, 18 EP, 59

[56] References Cited
    UNITED STATES PATENTS
    3,396,145  8/1968  Gruenwald ................... 260/47 EPCA

*Primary Examiner*—William H. Short
*Assistant Examiner*—T. Pertilla
*Attorney*—Robert L. Niblack

ABSTRACT: This invention relates to the method of hardening an epoxy resin containing 1,2-epoxy group in the presence of an N-(aminoalkyl)-lactam.

METHOD OF CURING EPOXY RESINS USING N-(AMINOALKYL)-LACTAMS OR DIAZA-BICYCLO-ALKENES

DETAILED DESCRIPTION

The hardening reaction of epoxy resins is an industrial process of ever-growing significance. Some of the previously known hardeners include alkylenepolyamines, e.g., ethylene diamine, diethylene triamine, triethylene tetramine, etc., aromatic amines, e.g., m-phenylene diamine, bis(4-aminophenyl)sulfone, bis(4-aminophenyl)methane and diphenylamine; amines which have both, a primary and a tertiary amino group in one molecule, e.g., N,N-dimethylaminopropylamine, N-(3-aminopropyl)-piperazine; tertiary amines, e.g., 2,4,6-tris(N,N-dimethylaminomethyl)-phenol, N,N-dimethylbenzylamine, triethylamine, N,N-dimethylaniline, N,N-dimethylcyclohexylamine or polyamide resins such as those prepared by condensing dimeric acid with alkylene polyamines; or imidazoles.

None of the above hardeners are completely satisfactory, for instance, aromatic amines are difficult to handle because they are solids and they require relatively high temperature and long periods for completely hardening epoxy resin, although they possess a relatively long potlife: alkylenepolyamines are inconvenient to use because of their objectionable amine odor and their toxicity and because they are unable to produce a cured resin with good physical properties on humid surfaces, although they are very active in promoting the epoxy reaction. Imidazoles, polyamides and N-dialkylpropylamines, which are generally known as hardeners for lower and middle temperature curing(5~60° C),are highly active as reactants with epoxy compound at these temperatures, but they have the defects that they give dark colored resins and are incapable to produce a satisfactory curing reaction on a humid surface and equally incapable of producing a cured resin with excellent physical properties.

It is therefore the object of the present invention to provide a method for accelerating hardening an epoxy resin with an amine which has no amine odor, which produces minimal discoloration of the resin, which is capable to harden an epoxy resin completely at only moderate temperatures while producing a cured epoxy resin with excellent physical properties, and which is soluble in a number of organic solvents.

This and other objects are accomplished by providing a method which comprises hardening an epoxy compound in the presence of at least one kind of a N-(aminoalkyl)-lactam of the formula

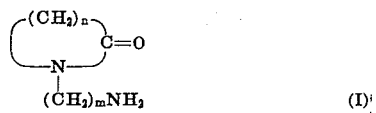

(I)

wherein $n$ is an integer from 2–11 and $m$ is an integer from 2–6. This lactam may be added to the resin as such or in the form of the analogous diaza-bicyclo-compound (wherein the above keto group and amine have reacted to form an unsaturated bond) and water which combination produces the above N-(aminoalkyl)-lactam in situ. For the purpose of this description, any reference to an N-(aminoalkyl)-lactam is to be considered synonymous to the combination of the bicyclo compound and water.

Representatives among the N-(aminoalkyl)-lactams represented by the above formula are the following: N-(3-aminopropyl)-β-propiolactam, N-(3-aminopropyl)-γ-butyrolactam, N-(6-aminohexyl)-γ-butyrolactam, N-(4-aminobutyl)-γ-butyrolactam, N-(3-aminopropyl)-γ-valerolactam, N-(2-aminoethyl)-ε-caprolactam, N-(3-aminopropyl)-ε-caprolactam, N-(6-aminohexyl)-ε-caprolactam, N-(3-aminopropyl)-μ-caprylolactam, and N-(3-aminopropyl)-λ-laurylolactam. Particularly useful are the compounds wherein $n$ is from 3 to 5 and $m$ is from 2 to 3 in the above general formula.

The N-(aminoalkyl)-lactams employed in the present invention are prepared easily by the cyanoethylation of corresponding lactams followed by hydrogenation, or dehydration of the corresponding lactones with alkylene diamines, or the hydrolysis of corresponding diaza-bicyclo-alkenes.

The amount of N-(aminoalkyl)-lactams employed in the present invention may be varied in a wide range according to the type of resin and application; generally, 1 to 90 percent (preferably 10 to 50 percent) by weight based on the epoxy compound is used.

The epoxy compounds employed in the present invention are the ones which are generally used in the field of epoxy resin, and are as follows; aliphatic polyepoxides, vinyl-cyclohexene-di-epoxides, dicyclopentadiene-di-epoxides, ethyleneglycol bis-(3,4-epoxytetrahydro-dicyclo-pentadien-8-yl) ether, (3,4-epoxytetrahydro-dicyclopentadien-8-yl) glycidyl ether, epoxidized polybutadiene, and the compounds having two epoxycyclohexyl groups, for example, diethyleneglycol-bis(3,4-epoxycyclohexane-carboxylate), bis-(3,4-epoxycyclohexyl methyl)-succinate; polyglycidyl ethers which are obtained in the presence of alkali by the reaction of polyhydric alcohols, diphenols and C. with epichlorohydrin or dichlorohydrin, for example, the compounds which are derived from ethylene glycol, diethylene glycol, triethylene glycol, 1,3-propylene glycol, 2,4,6-hexane-triol, glycerine, resorcinol, pyrocatechol, hydroquinone, 1,4-dihydroxy-naphthalene, bis-(p-hydroxphenyl)-methane, bis-(p-hydroxyphenyl)-methylmethane, bis-(p-hydroxyphenyl)-sulfone, bis-(p-hydroxyphenyl)-diphenylmethane. The present hardeners may be used admixture with more than one kind of the above epoxy compounds.

The N-(aminoalkyl)-lactams which are employed in the present invention can be prepared by the hydrolysis of corresponding diaza-bicyclo-alkenes, or the latter may be used per se together with water to produce the above lactam in situ. Thus, water may be present and is often an advantage for the curing of an epoxy resin at lower and middle temperature. This is an extremely beneficial characteristic of the present invention: it allows 1 epoxy compounds with N-(aminoalkyl)-lactams derived from the corresponding diaza-bicyclo-alkenes on moist surfaces.

The water employed in the above reaction may be moisture in the air or may be mixed purposely into the mixture of epoxy resin and a hardener. When using water, its amount may vary within wide limits: excellent results are obtained with from 1 to 30 percent and preferably 5 to 20 percent of water by weight based on the diaza-bicyclo-alkenes employed.

The diaza-bicyclo-alkenes which are employed in the present invention and produce N-(aminoalkyl)-lactam by the reaction with water, are represented by the general formula:

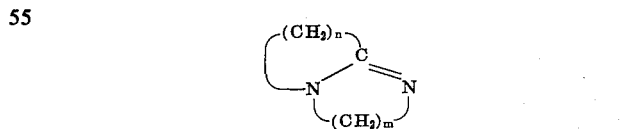

wherein $n$ and $m$ have the same meaning as in formula I. Representative examples are 1,5-diaza-bicyclo(4,2,0)octene-5, 1,8-diaza-bicyclo(7,2,0)undecene-8, 1,4-diaza-bicyclo(3,3,0)-octene-4, 1,5-diaza-bicyclo(4,3,0)nonene-5, 1,8-diaza-bicyclo-(7,3,0)dodecene-8, 1,7-diaza-bicyclo(4,3,0)nonene-6, 1,5-diaza-bicyclo(4,4,0)decene-5, 1,8-diaza-bicyclo(7,4,0)tridecene-8, 1,8-diaza-bicyclo(5,3,0)decene-7, 1,8-diaza-bicyclo(5,4,0)-undecene-7, 1,6-diaza-bicyclo(5,5,0)dodecene-6, 1,7-diaza-bicyclo(6,5,0)tridecene-7, 1,8-diaza-bicyclo(7,5,0)tetradecene-8, 1,10-diaza-bicyclo(7,3,0)dodecene-9, 1,10-diaza-bicyclo(7,4,0)-tridecene-9, 1,14-diaza-bicyclo(11,3,0)hexadecene-13 and 1,14-diaza-bicyclo(11,4,0)heptadecene-13.

The N-(aminoalkyl)-lactams or the corresponding bicyclo compounds are used in the same fashion as older amine hardeners for epoxy resin are used; however, they may be used by dissolving them in an organic solvent because, unlike older types of hardeners, they are very soluble in many kinds of organic solvents. There are no particular temperature conditions required for resin hardening by using the present hardeners; usually temperatures between 5° C. and 120° C. give excellent results. The above defined N-(aminoalkyl)-lactams have the distinctive advantage that they enable easy curing of epoxy resins at lower or middle temperatures, and/or on humid surfaces, producing colorless and flexible cured resins. They are particularly easy to use because they are liquid, have a low vapor pressure and no objectionable amine odor. Of course, acid addition salts of the above compounds can equally well be used in the same fashion. Particularly valuable addition salts are those formed between the above bicyclo compounds and phenol or fatty acids such as acetic acid or 2-ethylcaproic acid.

In order to illustrate the new utility of the above-described compounds, reference is made to the following examples which are not meant to limit the invention in any respect. All reference to parts is meant to indicate parts by weight.

EXAMPLE 1

To a 100 ml.-beaker containing 20 g. of the epoxy compound of structure

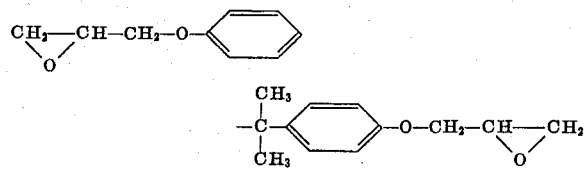

with an epoxy equivalent of 190, a certain amount of a catalyst or a hardener was added. The mixture was then agitated for 1 minute. Half of the mixture was allowed to stand at room temperature, and the other half was placed in a constant temperature oven at 80° C. Hardening times were measured and reported in table 1, using the following abbreviations: DBU is 1,8-diazabicyclo(5,4,0)-undecene-7; DBN is 1,5-diazabicyclo(4,3,0)nonene-5; H-3 is the ketimine sold as Epikure H-3, having a ketimine equivalent of 101; phr stands for parts per hundred (in weights).

TABLE I

Catalytic activities in the presence of an accelerator

| Kinds of hardener | DBU | | DBN | | 2-methyl-imidazole | | H-3 | |
|---|---|---|---|---|---|---|---|---|
| Amount of epoxy compound used (g.) | 20 | | 20 | | 20 | | 20 | |
| Temperature, (° C.) | 80 | 25 | 80 | 25 | 80 | 25 | 80 | 25 |
| | (Min.) | (Day) | (Min.) | (Day) | (Min.) | (Day) | (Min.) | (Day) |
| Amount of hardener used (phr.): | | | | | | | | |
| 5 | 30 | 1-5 | 16 | 1 | 56 | 1 | >240 | 7 |
| 10 | 16 | 1-3 | 11 | 1 | 32 | 1 | >240 | 7 |
| 15 | 13 | 1-2 | 5 | 1 | 29 | 1 | >240 | 7 |
| 20 | 12 | 1 | 3 | 1 | 27 | 1 | >240 | 7 |
| 25 | 10 | 1 | 3 | 1 | 27 | 1 | >240 | 7 |

The order of catalytic activity was as follows: DBN > DBU > 2-Methylimidazole > Ketimine DBN was much superior to DBU in its accelerating effect. If these catalytic activities were compared to each other by using the equivalent amount of them, DBU would be less inferior to DBN. 2-Methylimidazole was difficult to dissolve in the epoxy resin used and the cured resin tinted dark. The ketimine H-3 showed little catalytic activity.

EXAMPLE 2

The epoxy compound described in example 1 (20 g.) was mixed for 1 minute with 1 g. of a catalyst as identified below. The mixture was cured in an oven at 80° and the hardening times were found to be as follows: 37 minutes with 1,8-diazabicyclo-(5,4,0)undecene-7 (DBU); 83 minutes with DBU-phenolate; 120 minutes with DBU-2-ethylhexoate; 30 minutes with 1,5-diaza-bicyclo(4,3,0) nonene-5 and more than 4 hours when no catalyst was used.

EXAMPLE 3

This experiment was conducted to determine the curing reaction of an epoxy resin in the presence of water, using the compounds of the present invention and comparing the results with those obtained when using a previously known hardener.

The epoxy resin of example 1 was mixed with a certain amount of water. A hardener was added and the mixture was agitated for one minute. Half of the mixture was kept at 25° C. in a constant temperature room; the other half was placed in a constant temperature oven at 80° C. The hardening times were measured and the results are shown in tables II-V.

TABLE II

| Kinds of hardener | DBU | | DBN | | H-3 | |
|---|---|---|---|---|---|---|
| Amount of epoxy compound used (g.) | 20 | | 20 | | 20 | |
| Amount of water used (g.) | 1 | | 1 | | 1 | |
| Hardening temperature (° C.) | 80 | 25 | 80 | 25 | 80 | 25 |
| Amount of hardener used (phr.): | (min.) | (day) | (min.) | | (min.) | (day) |
| 5 | >240 | 1 | >240 | 1 day | >240 | 7 |
| 10 | >240 | 1 | 9 | 6 hours | >240 | 7 |
| 15 | 14 | 1 | 4 | 60-90 min | >240 | 7 |
| 20 | 9 | 1 | 4 | 17 min | >240 | 7 |
| 25 | 3 | 1 | 3 | 14 min | >240 | 7 |

TABLE III

| Kinds of hardener | DBU | | DBN | | H-3 | |
|---|---|---|---|---|---|---|
| Amount of epoxy compound used (g.) | 20 | | 20 | | 20 | |
| Amount of water used (g.) | 3 | | 3 | | 3 | |
| Hardening temperature (° C.) | 80 | 25 | 80 | 25 | 80 | 25 |
| Amount of hardener used (phr.): | (Min.) | | (Min.) | | (Min.) | (Day) |
| 5 | >240 | 1 day | >240 | >240 min | >240 | 1 |
| 10 | >240 | 1 day | >240 | >240 min | >240 | 1 |
| 15 | 10 | 1 day | 5 | 3-4 hrs | >240 | 1 |
| 20 | 8 | 3-4 hrs | 3 | 7 min | 35 | 1 |
| 25 | 8 | 3-4 hrs | 2 | 6 min | 25 | 1 |

TABLE IV

| Kinds of hardener | DBU | | DBN | | H-3 | |
|---|---|---|---|---|---|---|
| Amount of epoxy compound used (g.) | 20 | | 20 | | 20 | |
| Amount of water used (g.) | 5 | | 5 | | 5 | |
| Temperature (°C.) | 80 | 25 | 80 | 25 | 80 | 25 |
| Amount of hardener used (phr.): | (Min.) | | (Min.) | | (Min.) | (Day) |
| 5 | >240 | 1 day | >240 | 1 day | >240 | 7 |
| 10 | >240 | 1 day | >240 | 1 day | >240 | 7 |
| 15 | 10 | 1 day | 4 | 70 min | >240 | 7 |
| 20 | 10 | 1-2 hrs | 3 | 7 min | 27 | 7 |
| 25 | 7 | 1-2 hrs | 3 | 3 min | 17 | 7 |

TABLE V

| | Formulation | | | Hardening time (min.) | |
|---|---|---|---|---|---|
| Test No. | Epoxy compound (g.) | DBU (phr.) | Water (g.) | Room temp. | 80° C. |
| 1 | 20 | 40 | 4.75 | 70 | 10 |
| 2 | 20 | 30 | 3.55 | 140 | 15 |
| 3 | 20 | 20 | 2.40 | 320 | |
| 4 | 20 | 20 | 4.75 | | |

EXAMPLE 4

In this experiment, the presence of unreacted epoxy radicals was determined by infrared spectrum after curing and aging the resin as shown in table VI. The resin of example 1 (20 g.) was used with 0.95 g. of water and 8 g. of DBU.

TABLE VI

| Test No. | Curing temp. (° C.) | Curing time | Aging time and temp., ° C. | Unreacted epoxy radical |
|---|---|---|---|---|
| 1 | 20 | 70 min | 24 hr./20 | None. |
| 2 | 40 | 20 min | 40 min./40 | None. |
| 3 | 60 | 10 min | 50 min./60 | None. |
| 4 | 80 | 10 min | 50 min./80 | None. |
| 5 | 20 | 6-10 hrs | 23 hr./20 | None. |
| 6 | 20 | 70 min | 60 min./80 | None. |

EXAMPLE 5

In this experiment, the hardening times of epoxy resin with commercially used hardeners was determined, using the accelerators of the present invention. In each instance, the epoxy compound of example 1 and the accelerator were mixed before the hardener was added thereto at 80° C. The mixture was stirred for 1 minute and placed in an oven at 80° C. Table VII shows the amounts of the components used and the results, using the following abbreviations: DSA is dodecenyl-succinic anhydride, HHPA is hexahydrophthalic acid anhydride, MPDA is m-phenylene diamine, DETA is diethylenetriamine, DCDAM is 3,3'-dichloro-4,4'-diaminodiphenylmethane, PAA is a polyamide-amine, a liquid polyamide resin (condensation product between a polymeric fatty acid and a polyalkylene polyamine) sold as Polymide L-25-(3) having a total amine value of 330 mg. KOH/g., and TDI is tolylene diisocyanate.

TABLE VII

| | Kind of hardener | | | | | | | |
|---|---|---|---|---|---|---|---|---|
| | DSA | HHPA | MPDA | DETA | DCDAM | PAA | TDI | Water |
| Amount of hardener used (phr.) | 130 | 80 | 15 | 8 | 30 | 67 | 43 | 5 |
| Amount of catalyst used (phr.) | 5 | 5 | 5 | 5 | 5 | 5 | 5 | 30 |
| Curing temperature (° C.) | 100 | 80 | 80 | 25 | 80 | 25 | 25 | 80 |
| | Hardening time (min.) | | | | | | | |
| Kind of catalyst: | | | | | | | | |
| DBU | 29 | 27 | 14 | 90 | 10 | 116 | 115 | 11 |
| DBN | 20 | 21 | 11 | 75 | 8 | 70 | 100 | 9 |
| DBU phenolate | 43 | 43 | 16 | 75 | 15 | 85 | 120 | 15 |
| DBU acetate | 61 | 65 | 24 | 100 | 25 | 110 | 130 | 18 |
| DBU 2-ethylhexoate | 56 | 60 | 25 | 100 | 25 | 118 | 135 | 21 |
| No catalyst | >240 | >240 | >240 | >240 | >240 | 135 | >240 | >240 |

EXAMPLE 6

The epoxy compound of example 1 was hardened with DSA (ratio 1:1.3) in the presence of 5 phr of DBU at various temperatures and the curing times were compared with those obtained using 2,4,6-tri(dimethylaminomethyl)phenol (TDMP), a commercially used epoxy hardening catalyst. The results obtained are shown below (m = minutes).

TABLE VIII

| | Temperature (° C.) | | | | | |
|---|---|---|---|---|---|---|
| | 25 (potlife) | 60 | 70 | 80 | 100 | 120 |
| DBU | 5 days | 253 min | 143 min | 80 min | 29 min | 20 min |
| TDMP | 2 days | 104 min | 92 min | 41 min | 20 min | 19 min |

Below 100°, DBU is less efficient as a catalyst than TDMP, but, at elevated temperatures, its efficiency is greatly increased and about equal to the commercial catalyst at 120° C. However, with the markedly increased potlife (the time the resin mixture remains useful at room temperature), DBU offers an unusual and very useful combination of properties.

EXAMPLE 7

In this experiment, the hardness of resins of various formulations was tested after various hardening times. Formulation A: 20 g. of the resin of example 1, 8 g. of DBU and 0.95 g. of water, formulation B uses 20 g. of the same resin with 5.9 g. of N-dimethylaminopropylamine. The hardness of the cured resin was tested with the Barcol hardness tester, measuring the indentation produced by a penetrator under hand pressure (Barcol part No. 935); the numbers shown below are those of the Rockwell M-scale.

| Hardening time (hours) | 1 | 2 | 3 | 4 |
|---|---|---|---|---|
| Formulation A | 83 | 83 | 83 | 83 |
| Formulation B | 55 | 65 | 68 | 75 |

The resin of formulation A was allowed to remain at room temperature for 1 day and was then further cured for 1 hour at 120° C. The hardness was still found to be 83.0; compression strength was 9.2 kg./mm.$^2$ and flexural strength was 6.77 kg./mm.$^2$. The results show that with water and DBU, the ultimate hardness is achieved after only 1 hour, while when using the commercial hardener, only gradual hardening is obtained.

EXAMPLE 8

In 20 g. of the epoxy compound of example 1, 7.7 g. of N-(3-aminopropyl)-γ-butyrolactam was dissolved and the mixture was allowed to stand at 20°±1° C. After 3 hours, a pale yellow and transparent cured resin was obtained. Inspection of the IR spectrum showed the absence of any free epoxy radicals.

When using 9 g. of N-(3-aminopropyl)-ε-caprolactam in place of the above butyrolactam, the cured resin after 4 hours at 20°±1° C. had the same visual appearance and was also devoid of free epoxy radicals. This mixture was also used for preparing molds to measure various physical properties of the resin: hardness, established on the Barcol impression test described above, was 78.0 on the Rockwell M-Scale; the compression strength was 8.8 kg./mm.$^2$, and flexural strength, measured on a mold of 80×10×4 mm., was 7.2 kg./mm.$^2$.

EXAMPLE 9

The epoxy compound of example 1 (60 g.) was mixed with 40 g. Polymide L–25–(3), 0.4 g. water, and 2.8 g. DBN to a uniform paste by stirring the components for 1 minute at room temperature. This mixture was applied to a glass plate as a 1 mm., thick layer and allowed to stand 24 hours at 5° C. to form a cured, transparent resin.

EXAMPLE 10

A mixture of 20 g. of the epoxy compound of Example 1 and 9 g. of N-(3-aminopropyl)-ε-caprolactam (total amine value = 297 mg. KOH/g., tertiary amine value = 27.4 mg. KOH/g., secondary and tertiary amine value—48.2 mg. KOH/g.) was kept at room temperature; it gradually hardened and after 4 hours showed no free epoxy radicals upon IR-inspection. The physical properties of the resin were substantially identical to the epoxy resin hardened with DBU, although hardening was somewhat slower.

EXAMPLE 11

Epoxy resins were hardened in the manner shown in the above examples, using different hardening or curing temperatures in the presence or absence of water and/or a hardener. The times required for hardening the resin are shown in table IX below, using the catalysts indicated at 30 phr. The hardener used was Polymide L–25–(3) described above.

TABLE IX

| Hardener (phr.) | 0 | 0 | 0 | 0 | 67 | 67 |
|---|---|---|---|---|---|---|
| Water (phr.) | 5 | 5 | 0 | 0 | 5 | 0 |
| Temperature (° C.) | 80 | 25 | 80 | 25 | 25 | 25 |
| No catalyst (min.) | >240 | >240 | >240 | >240 | >240 | |
| TDMP (min.) | 3 | 29 | 9 | 60 | 39 | 105 |
| DBU (min.) | 11 | >240 | 19 | >240 | 65 | 203 |
| DBU-phenolate (min.) | 15 | >240 | 15 | >240 | 72 | 200 |
| DBU-2-ethyl hexoate (min.) | 21 | >240 | 14 | >240 | | |

The above results show that a mixture between an epoxy compound and a commercial hardener can be hardened much faster when using an accelerator but that in the absence of water, a mixture of hardener, epoxy compound and catalyst has a very advantageous potlife. Adding water, the hardening reaction proceeds rapidly, particularly at elevated temperatures.

From the above examples and disclosure it will be seen that epoxy resins can be hardened in the presence of the lactams of formula I or the corresponding diaza-bicyclo-compounds in combination with water; or a mixture of an epoxy resin and a customary hardener can be cured at a much accelerated speed in the presence of the lactams of the present invention. When the corresponding bicyclic compounds are used in place of the corresponding lactams, at least one molar equivalent of water must be present. Since such an amount of water is obviously required in the ring-opening reaction of the bicyclic compound, the presence of water in the above examples has not been specifically indicated. Excess water or moisture is acceptable, whether using the lactams or the corresponding bicyclic compounds and whether using such compounds as hardeners or as accelerators in the hardening process with other hardeners and epoxy compounds. The fact that the bicyclic compounds require the presence of water makes the process of the present invention particularly useful and unique: the potlife of an epozy compound and bicyclic compound, in the presence or absence of a hardener, is advantageously long while, upon adding water, the hardening process goes rapidly to completion.

Complete curing of an epoxy resin can be accomplished by the use of the above compounds and, depending upon the amount of the above accelerator used or the temperature employed, the hardening reaction can be governed at will: with higher temperature and the use of larger proportions of the above lactams, complete curing can be accomplished within a few minutes; conversely, with a low proportion of a lactam, complete curing can be delayed at room temperature for several hours. In either case, the resulting resin is clear, flexible, hard, colorless and transparent.

Although the above examples are mainly directed to the epoxy compound specifically described in example 1, it will be obvious to those skilled in the art that any epoxidized compound can be polymerized or hardened by the process of the present invention. A selection of specific epoxy compounds particularly useful for this process are listed above.

We claim:
1. A process of hardening an epoxy resin containing 1,3-epoxy groups alone or in combination with an organic epoxy hardener, said process of hardening being carried out at a temperature of between 0° and 120° C. in the presence of 1 to 90 percent by weight, based on the weight of said epoxy resin, of at least one N-(aminoalkyl)-lactam of the formula:

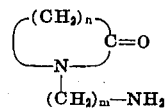

wherein $n$ is an integer of 2 to 11 and $m$ is an integer of 2 to 6.

2. The process of claim 1 wherein said N-(aminoalkyl)-lactam is prepared in situ from the corresponding diaza-bicyclo-alkene of the formula:

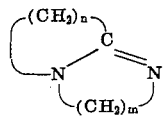

or an acid addition salt thereof under conditions so as to effect hydrolysis to said N-(aminoalkyl)-lactam.

3. The process of claim 2 wherein said diaza-bicyclo-alkene is 1,8-diazo-bicyclo(5,4,0)undecene-7.

4. The process of claim 2 wherein said diaza-bicyclo-alkene is 1,5-diaza-bicyclo(4,3,0)nonene-5.

5. The process of claim 1 wherein $n$ is an integer from 3 to 5 and $m$ is 2 or 3.

6. The process of claim 1 wherein said N-(aminoalkyl)-lactam is N-(3ε-caprolactam.

7. The process of claim 1 wherein said N-(aminoalkyl)-lactam is N-(3-aminopropyl)-γ-butyrolactam.

8. The process of claim 2 wherein water is present in an amount of from 1 to 30 percent by weight based on the amount of said diaza-bicyclo-alkene to effect said hydrolysis.